March 4, 1930.  G. MESSTORFF  1,749,295

CONTROL SYSTEM FOR OSCILLATION CIRCUITS

Filed June 14, 1924

INVENTOR
GERHARD MESSTORFF
BY
*H. C. Van Deventer*
ATTORNEY

Patented Mar. 4, 1930

1,749,295

UNITED STATES PATENT OFFICE

GERHARD MESSTORFF, OF SPANDAU, NEAR BERLIN, GERMANY, ASSIGNOR TO THE FIRM DR. ERICH F. HUTH GES. M. B. H., OF BERLIN, GERMANY

CONTROL SYSTEM FOR OSCILLATION CIRCUITS

Application filed June 14, 1924, Serial No. 720,108, and in Germany May 15, 1923.

An application for this invention has been filed in Germany, May 15, 1923.

My invention relates to systems for generating oscillations and more particularly to the method of controlling, starting and stopping of oscillations and also the amplitude thereof.

It is well known in the art to employ photo electric cells in connection with amplifying tubes for various purposes such as measuring, or the operation of relays. In such arrangements, variations in the response of the photo electric cell to illumination thereof influence the grid of the amplifying tube, the degrees of amplification varying in accordance with the characteristics of the amplifying tube employed. To this end a certain minimum amount of variation of illumination is necessary in order to secure sufficient potential variation to control the grid of the tube and to produce a corresponding anode current variation.

An object of the present invention is to increase the effect described and to provide an arrangement comprising a photo-electric cell and an electron discharge device whereby very small variations of the illumination of the cell will produce comparatively large variations of an electric current, adapted, for instance, for directly actuating a relay.

Another object of the present invention is to increase the degree of amplification and consists in coupling a photo electric cell in an oscillating circuit in such manner that the starting or stopping of oscillations may be effected directly by the conductivity of the cell responsive to the incident light.

According to this invention, a self-oscillating vacuum tube is provided having output and input circuits and a feed back circuit connection for maintaining oscillations in a well-known manner. The feed back circuit of the oscillating tube is influenced in accordance with the conductivity of the cell so that oscillations start or stop responsive to the variations in the cell; e. g. the conductivity of the cell may influence a resonant circuit tuned to the oscillation and so associated with the feed back circuit as to absorb the oscillating energy, responsive to the variations in the cell. In the latter case the oscillations of the tube circuit will cease if the reaction coupling is arranged loosely.

Figure 1:
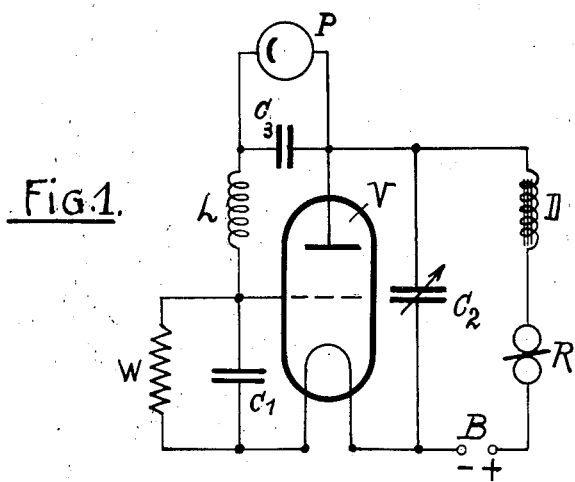
Figure 2:
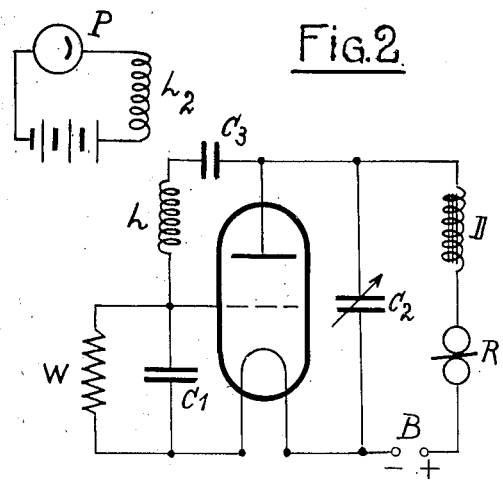

The invention may be best understood from the accompanying drawing, wherein Figure 1 is a diagrammatic illustration of one circuit embodying my invention, and Fig. 2 is a diagrammatic illustration of another circuit also embodying my invention.

Referring to the circuit of Fig. 1, V indicates the vacuum tube, D the high frequency choke coil in circuit with the plate of the vacuum tube and the battery, the terminals of which are indicated by B. The variable condenser $C_2$ is connected between the plate and filament circuits for adjusting the frequency of the oscillations. The condenser $C_1$ is connected between the circuit of the grid of the tube and the filament circuit and has shunted thereacross a leak resistance W. An inductance L and a condenser $C_3$, the latter acting also as a blocking condenser preventing the high voltage of the anode battery B from being applied to the grid of the tube, are connected in series between the grid and the plate circuits of the vacuum tube to secure sufficient feed back potential to be applied to the grid of the tube.

A relay or other output means is indicated at R.

A photo electric cell P has the terminals thereof shunted across the blocking condenser $C_3$ so that one terminal is connected to the plate circuit and the other terminal is connected to the inductance L.

The system just described may be so adjusted that it is not oscillating. When the resistance of the circuit comprising the condenser $C_3$ and the photo electric cell is very high i. e. when the cell is not illuminated. Accordingly, the charge on the grid is negligible.

When the cell is illuminated, the resistance of the system comprising the condenser $C_3$ and the cell is very much decreased so that a current can flow through that circuit and through the inductance L to begin the generation of oscillations.

Referring to Fig. 2, the various elements of the circuit are as described above in connection with Fig. 1, and the connections of the several elements are the same except the connection of the photo electric cell to the oscillation circuit. In Fig. 2 the photo electric cell is connected in series with a coil $L_2$ and a source of power and this independent closed circuit is inductively coupled to the inductance L and acts like an absorption circuit.

The elements L and $L_2$ are loosely coupled and such coupling is easily affected by any possibly inductive system so associated with the oscillation feed back circuit as to absorb energy therefrom.

Accordingly, in the circuit shown in Fig 2, a small change in conductivity of photo electric cell P in its independent circuit is sufficient to have a great influence on the oscillation circuit. That is to say, when the photo electric cell is illuminated, oscillating current can flow in that circuit. Regarding the associated elements L and $L_2$ as a transformer, energy is drawn from the primary circuit, of which the oscillation circuit is a part, to such an extent that oscillations cease in the plate circuit of the tube.

Accordingly, by my invention is provided a method of directly changing the amplitude of oscillations by variations in the illumination of the photo electric cell.

As pointed out above, a relay or other device may be connected in the oscillation circuit so as to be operated in accordance with the control of the oscillation generator described above.

Modifications may be made in the arrangement, location and construction of parts within the spirit and scope of my invention and such modifications are intended to be covered by the appended claims.

I claim:—

1. The combination with an oscillation circuit comprising an oscillation generator having a plate, grid and filament, an input circuit including said grid and filament, an output circuit including said plate and filament, an inductance and a condenser disposed between said input and output circuits and a photo electric cell connected to said condenser so that variations in the illumination of said cell will control the amplitude of oscillations of said circuits.

2. The combination with an oscillation circuit comprising an oscillation generator having a plate, grid and filament, an input circuit connecting said grid and filament electrodes, an output circuit connecting said plate and filament electrodes, an inductance, and a condenser in said input circuit and a photo electric cell connected to said inductance and condenser so that variations in the illumination of said cell will control the amplitude of oscillations of said circuits, and means connected to said output circuit for actuation by said oscillations.

3. The combination with an oscillation circuit comprising an oscillation generator having a plate, grid and filament, an input circuit connecting said grid and filament electrodes, an output circuit connecting said plate and filament electrodes, a series circuit including an inductance and a condenser connected between said input and said output circuits a photo electric cell connected to said series circuit so that the variations in the illumination of said cell will control the amplitude of current in the oscillation generator.

4. The method of controlling the amplitude of current for correspondingly controlling the starting and stopping of oscillations of an oscillation generator which consists in connecting a photo electric cell to the oscillation generator and absorbing energy from the output circuit of said generator in accordance with variations in illumination of the cell for proportionately affecting the operation of the oscillation generator.

5. In a system for controlling the amplitude of current in an oscillation generator circuit for starting and stopping of oscillations, an electron tube having grid, filament, and plate electrodes, an input circuit including said grid and filament electrodes, an output circuit interconnecting said plate and filament electrodes, a bridging circuit disposed between said input and output circuits, and a photoelectric cell system connected with said bridging circuit and arranged to absorb oscillations from said first mentioned circuits in accordance with variations in actinic light for correspondingly changing the amplitude of oscillations in said circuits.

6. The method of generating alternating currents in accordance with variations of light intensity which comprises influencing the feed back circuit of an oscillator in accordance with the variations of light intensity.

7. In a translating arrangement for photoelectric cells comprising a photo-electric cell, a vacuum tube having input and output oscillating circuits, a feed back circuit to said input and said output circuits, and means to control the electric conditions of said circuit in accordance with the illumination of said photo-electric cell.

8. In a system for controlling the amplitude of current in an oscillating generator, an oscillating device, operating circuits associated with said device for maintaining undamped electrical oscillations and a photoelectric cell modulation system connected with at least one of said circuits and arranged to absorb oscillating energy in accordance with variations of load for correspondingly changing the amplitude of oscillations in said circuits.

9. In a system for controlling the amplitude of current in an oscillating generator, an oscillating device, oscillatory circuits associated with said device for maintaining undamped electric oscillations and a modulation system connected with at least one of said circuits and arranged to absorb oscillating energy in accordance with variations of the modulating currents for changing the amplitude of oscillations in said circuits.

In testimony whereof I affix my signature.

GERHARD MESSTORFF.